(12) United States Patent
Takatsugi et al.

(10) Patent No.: US 6,328,551 B1
(45) Date of Patent: Dec. 11, 2001

(54) EXCESSIVE LOAD DETECTING DEVICE FOR AN INJECTION SCREW OF AN INJECTION MOLDING MACHINE

(75) Inventors: Satoshi Takatsugi, Minamitsuru-gun; Hiroshi Watanabe, Fujiyoshida; Wataru Shiraishi, Minamitsuru-gun, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/662,335

(22) Filed: Sep. 14, 2000

(30) Foreign Application Priority Data

Sep. 16, 1999 (JP) .................................................. 11-262734

(51) Int. Cl.$^7$ .................................................. B29C 45/77
(52) U.S. Cl. .......................... 425/145; 425/155; 425/170; 425/171
(58) Field of Search .................................... 425/145, 155, 425/170, 171

(56) References Cited

U.S. PATENT DOCUMENTS

| | | |
|---|---|---|
| 5,720,912 | 2/1998 | Liehr et al. . |
| 5,911,924 | 6/1999 | Siegrist et al. . |

FOREIGN PATENT DOCUMENTS

| | | |
|---|---|---|
| 399 312 B | 4/1995 | (AT) . |
| 44 36 117 A1 | 3/1996 | (DE) . |
| 0 228 799 A2 | 7/1987 | (EP) . |
| 0 674 984 A1 | 10/1995 | (EP) . |
| 1 020 279 A1 | 7/2000 | (EP) . |

*Primary Examiner*—Tim Heitbrink
(74) *Attorney, Agent, or Firm*—Staas & Halsey, LLP

(57) ABSTRACT

An excessive load detection device for an injection molding machine capable of detecting an excessive load exerted on the injection screw when the screw is driven with resin remaining unmolten in the heating cylinder. An output torque of the servomotor for axially moving the screw is limited to a predetermined value by a torque limiter and the screw is driven to move forward in a direction of injection by a predetermined amount at a predetermined velocity. If reference time elapses before the axial motion of the set amount is completed or a position deviation exceeds a reference value, it is determined that the remaining resin has low fluidity to cause an excessive load on the screw and an alarm is issued. When the axial motion of the screw is completed without an alarm, the screw is moved backward and forward alternately predetermined times. A servomotor for rotating the screw is driven in the same manner to detect an excessive load on the screw. Since the excessive load on the screw is directly detected, the excessive load is securely detected.

13 Claims, 5 Drawing Sheets

EXCESSIVE LOAD DETECTING DEVICE FOR AN INJECTION SCREW OF AN INJECTION MOLDING MACHINE

BACKGROUND OF THE INVENTION

1. Field of the Invention

The present invention relates to an injection molding machine, and in particular to an excessive load detecting device for detecting an excessive load exerted on an injection screw when the screw is moved with resin remaining unmolten in a heating cylinder.

2. Description of Related Art

FIG. 5 schematically shows a melting state of resin in a heating cylinder of an injection molding machine. In FIG. 5, an injection screw 3 is inserted into a heating cylinder 1 having a nozzle 2 at a distal end thereof with an appropriate clearance therebetween. Heaters 5 such as band heaters are arrange around the heating cylinder 1 and also the nozzle 2. Resin pellets 7 are supplied into the heating cylinder 1 from a hopper 6. The resin pellets 7 are molten by heat from the heating cylinder 1 and by frictional heat produced by kneading by rotation of the screw 3, and accumulated in the distal end of the cylinder 1. The accumulated molten resin is injected into a cavity of a mold by moving the screw 3 forward in its axial direction.

In FIG. 5, the molten resin 7a is shown as a part with light daub in the cylinder 1 and the unmolten resin pellets 7b are shown as a part with dark daub in the cylinder 1.

If the molten resin 7a remains in the cylinder 1 when an operation of the injection molding machine is stopped after predetermined injection molding operations are finished, the molten resin 7a is solidified with decrease of temperature of the cylinder 1. In restarting molding operations, an excessive load is exerted on the screw 3 if the screw 3 is moved with the solid resin remaining unmolten at the distal end of the cylinder 1.

Thus, it is necessary to determine whether or not normal driving of the screw 3 for axial and rotational motions thereof is possible when restarting the operation of the injection molding machine. Conventionally, this determination is carried out based on confirmation that the temperature of the heating cylinder 1 reaches a predetermined value. In the state where the solid resin 7a remains in the cylinder 1 to fix the injection screw 3 to the cylinder 1, an excessive stress is produced on the screw 3 to possibly cause a considerable damage on the screw 3 and a screw head thereof by an axial or rotational motion of the screw 3. To avoid such an event, the driving of the screw 3 is started after confirming that the temperature of the cylinder 1 has reached to the predetermined value in the conventional practice. In this way, the load on the screw 3 is presumed indirectly based on the temperature of the cylinder 3.

If the temperature of the cylinder 1 reaches the predetermined value, the solid resin 7a is not molten remaining the solid state or the solid resin 7a is molten to have such a high viscosity as to cause an excessive load on the screw and the screw head. The excessive load causes high pulling stress, pressing stress and torsion stress on the screw and the screw head and may cause fatigue failure of the screw and the screw head.

In view of the above, it has been adopted a method in which the driving of the screw is started when predetermined time elapses after the temperature of the cylinder reached the set temperature so that the temperature in the cylinder reaches a target value. Further, there is proposed in Japanese Pat. No. 2,597,922, a method of determining viscosity of the resin in the cylinder based on comparison between a position deviation between a position command and an actual position when the screw is driven at low speed and low torque in the backward direction for a predetermined time period, and a predetermined value. If the resin remains umolten in the cylinder when the screw is driven at low speed and low torque, the motor can not rotates at the commanded speed to make the deviation between the position command the actual position. Thus, the load exerted on the screw is determined based on the comparison between the position deviation and the predetermined value and if the position deviation does not exceed the predetermined value, it is determined that the resin has been molten to have an adequate fluidity.

In the method of starting the driving of the screw when the predetermined time elapses after the temperature of the cylinder reached the set temperature, the load on the screw is presumed indirectly and there is no assurance that no excessive load is exerted on the screw. Thus, the actual temperature and fluidity of the resin are not certain because these factors are influenced by ambient temperature and humidity, etc. Further, there may be a case where an accurate temperature is not detected due to a failure of a temperature sensor for the cylinder to result a driving of the screw with resin of high viscosity.

In the method of determining the load on the screw by moving the screw backward, the load on the screw by the resin remaining unmolten in grooves of the screw head, which is thick and thus requires a long time to be molten, can not detected.

FIGS. 6 and 7 schematically show the distal end of the cylinder 1. FIG. 7 is a sectional view along a line VII—VII in FIG. 6. The molten resin 7a accumulated in the distal and of the cylinder 1, the grooves of the screw head and the nozzle 2. The solidified resin in this area requires a long time for remelting and exercise a great influence on the load exerted on the screw when the screw is driven to rotate or move axially. If the screw and the screw head are completely fixed to the cylinder, the screw 3 is not moved by driving the screw backward so that an excessive load is detected. However, in the state where the resin is molted to a certain degree to have low viscosity, the screw moves backward by the backward driving to give a determination that the resin is adequately molten. When the screw is driven to move forward to inject the resin from the nozzle 2, the resistance of resin flowing through an injection hole at a distal end thereof and a connecting portion of the cylinder 1 and the nozzle 2 increases when the resin has high viscosity to exert a great load on the screw and the screw head. Thus, there is a great difference between the loads exerted on the screw when the screw is driven to move forward and backward. In the method of detecting fluidity of resin by driving the screw to move backward, the excessive load exerted on the screw w hen the screw is driven to move forward which is greater than the load exerted on the screw when the screw is driven to move forward.

SUMMARY OF THE INVENTION

A device for detecting an excessive load on a screw of an injection molding machine according to the present invention comprises: a servomotor for axially moving or rotating the screw, a controller for driving the servomotor at a limited torque or a predetermined low torque, a timer for measuring elapsing time from a start of the driving of the servomotor, a detector for detecting an amount of motion of the servomotor or the screw. According to one aspect of the invention, the controller drives the servomotor to axially move the screw in a direction of injection or rotate the screw by a predetermined amount at a predetermined velocity. If reference time elapses before the motion of the predetermined amount is completed, it is determined that resin remaining in a heating cylinder has low fluidity to cause an excessive load on the screw and an alarm is issued. According to another aspect of the invention, the controller drives the servomotor at a predetermined velocity for a predetermined time period and issues an alarm when the amount of motion detected by the detector for the predetermined time period does not exceed a reference amount.

The controller may repeatedly execute the driving of the servomotor for axially move the screw in the direction of injection and the reversed direction alternately predetermined times or repeatedly execute the driving of the servomotor for rotating the screw predetermined times.

Further, the controller may include a servo-controller for performing a position/velocity feedback control using a position deviation for the servomotor, and issue an alarm when the position deviation exceeds a reference value before the axial motion of the predetermined amount is completed.

DETAILED DESCRIPTION OF THE PREFERRED EMBODIMENTS

Figure 1:
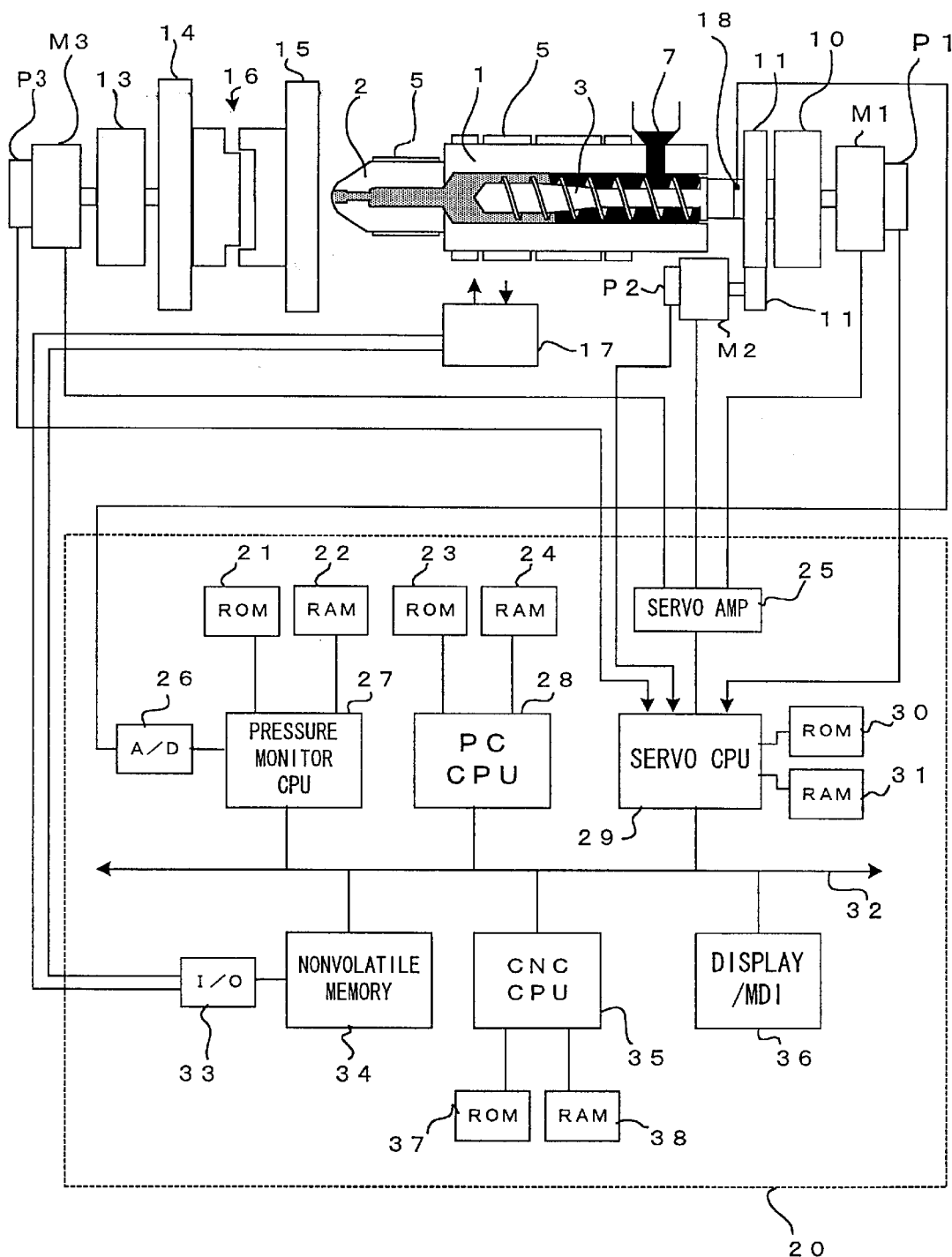
FIG. 1 is a block diagram of an electrically operated injection molding machine and a controller therefor according the present invention.

In FIG. 1, heaters 5 such as band heaters and temperature sensors (not shown) such as thermocouples are provided around an injection cylinder 1 and a nozzle 2 attached to a distal end of the cylinder 1. The heaters 5 and the associated temperature sensors are provided for individually controlling respective portions of the injection cylinder 1 and the nozzle 2. A temperature controller 17 controls temperatures of respective portions of the injection cylinder 1 and the nozzle 2 by controlling the heaters 5 on the basis of PID control.

Stationary and movable molds 16 are attached to a stationary platen 15 and a movable platen 14, respectively. The movable platen 14 is driven to move along tie bars (not shown) by a clamping servomotor M3 through a driving force converter 13 comprising a ball screw/nut and a toggle mechanism. The screw 3 is driven to move in its axial direction by a servomotor M1 for axial motion of the screw through a driving force converter 10 comprising a ball screw /nut and a boss/serration mechanism. The screw 3 is driven to rotate by a servomotor M2 for screw rotation through a gear transmission mechanism 11, 12 for kneading and metering of resin, independently with the axial motions. Position sensors P1, P2 and P3 such as pulse coders are provided at servomotors M1, M2 and M3, respectively. The axial position and velocity and the rotational position and velocity of the screw 3, and position and velocity of the movable platen 14 (and the movable mold) are detected based on the rotational positions and velocities of the servomotors M1–M3 detected by the position sensors P1–P3.

A controller 20 for controlling the injection molding machine has a CPU (central processing unit) 35 as a microprocessor for CNC (computerized numerical control), a CPU 28 as a microprocessor for PC (programmable controller), a CPU 29 as a microprocessor for servo control and a CPU 27 as a microprocessor for pressure monitor including sampling of pressure in a pressure holding process and back pressure of the screw 3. The microprocessors transfer information with one another through a bus 32 by appropriately selecting mutual input/output.

The PC CPU 28 is connected with a ROM 23 which stores a sequence program for controlling sequence motion of the injection molding machine, and a RAM 24 for temporary storage of computing data. The CNC CPU 35 is connected with a ROM 37 storing an automatic operation program and a RAM 38 for temporary storage of computing data.

The servo CPU 29 is connected with a ROM 30 which stores a control program dedicated for the servo control, and a RAM 31 for temporary storage of data. The pressure monitor CPU 27 is connected with a ROM 21 which stores a control program for sampling of pressures, and the RAM 22 for temporary storage of data.

Further, the servo CPU 29 is connected with a servo amplifier 25 for driving servomotors M1, M2 and M3 for axial motion of the screw, rotation of the screw and mold clamping, respectively. The outputs of position/velocity detectors P1, P2 and P3 associated with respective servomotors M1, M2 and M3 are fed back to the servo CPU 29 to perform position and velocity feedback controls. Further, driving currents outputted from the servo amplifier 25 to respective servomotors are fed back to the servo CPU 29 to perform current feedback controls. The pressure monitor CPU 27 receives signals from a pressure detector 18 such as a load cell provided at a proximal portion of the screw 3 through an A/D converter 26, to perform sampling of pressure in a pressure holding process and the back pressure of the screw 3.

A nonvolatile memory 34 is provided for storing molding data including molding conditions (pressure holding condition, metering condition and set temperature of the nozzle 2, the heating cylinder 3, etc.), various set values, parameters, macro variables, etc.

A manual data input device 36 with a CRT or LCD has numeric keys for inputting numeric data and function keys for selecting function menus and inputting various data referring graphic images on the CRT or LCD.

With the above configuration, the PC CPU 28 controls a sequence motion of the injection molding machine, the CNC CPU 35 distributes motion commands for the servomotor for each axis based on the control program stored in the ROM 37, and the servo CPU 29 performs a digital servo control including position loop, velocity loop and current loop controls based on the distributed motion commands for each axis and position/velocity feedback signals detected by the position/velocity detector.

The PC CPU 28 set the target temperature for respective portions of the injection cylinder 1 and the nozzle 2 through the input/output circuit 33, for respective portions stored in the nonvolatile memory 34. The temperature regulator 17 performs temperature control of the respective portions of the injection cylinder 1 and the nozzle 2 fed back from the temperature sensors not shown, by performing a PID feedback control. The respective temperatures of respective parts of the heating cylinder 1 and the nozzle 2 are read by the PC CPU 28 through the input/output circuit 33.

Figure 4:
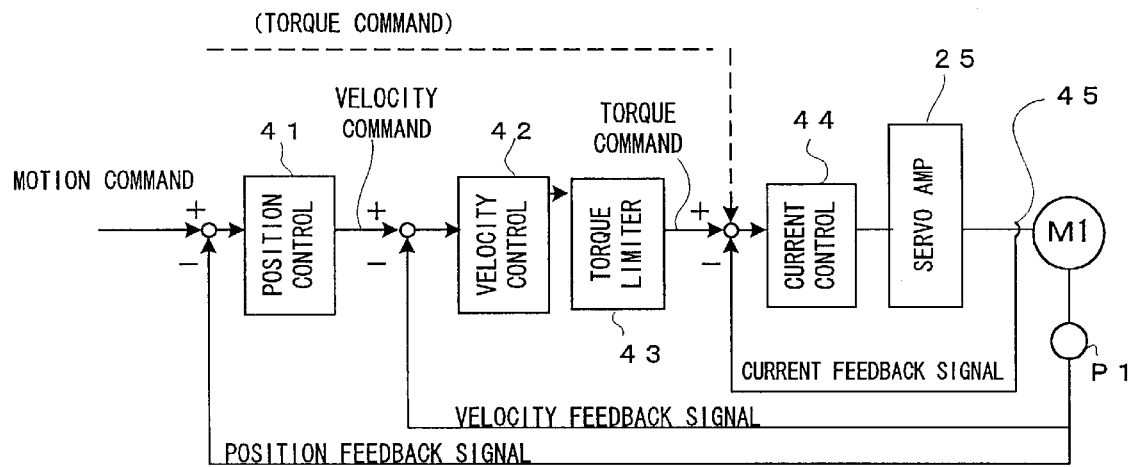
FIG. 4 is a block diagram of a servo control of a motor of the injection molding machine as shown in FIG. 1.
Figure 5:
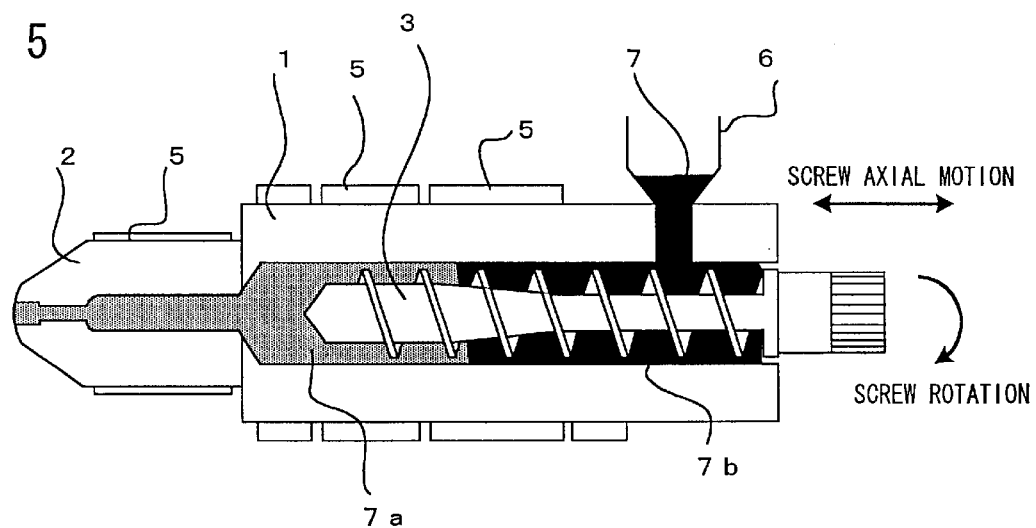
FIG. 5 is a schematic diagram showing state of resin in of a heating cylinder of the injection molding machine.
Figure 6:
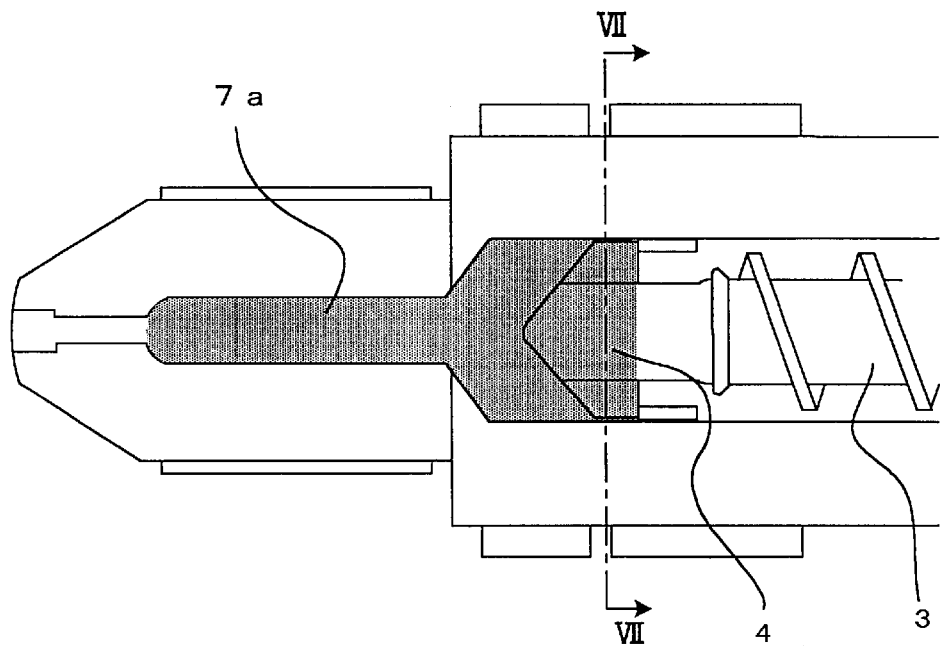
FIG. 6 is an enlarged view of the screw head and the nozzle of the injection molding machine for showing a sticking state of screw head with the cylinder and the nozzle.
Figure 7:
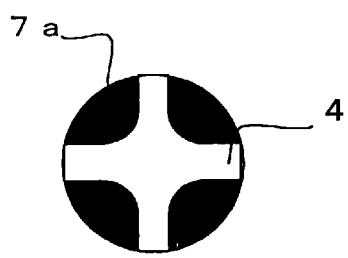
FIG. 7 is a sectional view along a line VII—VII in FIG. 6.

FIG. 4 is a block diagram showing a servo control to be performed by the servo CPU 29 in an example for the servomotor M1 for axially moving the screw. The same control is performed for the other servomotors M2 and M3.

A position deviation is obtained by subtracting the position fed back from the position/velocity detector P1 from the motion command distributed from the CNC CPU 35 and the position deviation is multiplied by a position gain to obtain a velocity command in the position control section 41. A velocity deviation is obtained by subtracting the actual velocity fed back from the position/velocity detector P1 from the velocity command outputted form the position control section 41, and the velocity deviation is multiplied by a velocity gain to obtain a torque command. A maximum value of the torque command outputted from the velocity control section 42 is limited to a torque limit value by a torque limiter 43. Thus, when the torque command outputted from the velocity control section 42 is greater that the torque limit value, the torque limit value is outputted from the torque limiter 43, and the torque command not more than the torque limit value is outputted from the torque limiter 43 to a current control section 44.

The current control section 44 performs a current control based on the torque command outputted from the torque limiter 43 and the current feedback signals from a current detector 45 to obtain a voltage command for the servo amplifier 25 for driving a servomotor M1 on the basis of PWM control.

The foregoing servo control is performed by the servo CPU 29 on the basis of software control. The details of the software control is well known in the art and thus is omitted here.

The torque command indicated by a dotted line is for another control of the servomotor for detecting an excessive load on the screw, as described later.

The processing of detecting an excessive load on the screw to be executed by the PC CPU 28 in FIG. 1 will be described referring to the flowchart of FIGS. 2 and 3. The determination of the melting state of the resin remaining in the heating cylinder 1 in front of the screw head 4, and whether or not the screw 3 can be driven normally is necessary to perform a purge of the resin remaining in the cylinder 1. Therefore, the processing of detecting an excessive load on the screw is incorporated in a sequence program immediately before automatic purge processing so that the excessive load detection processing is executed every time when the automatic purge processing is executed.

Figure 2:
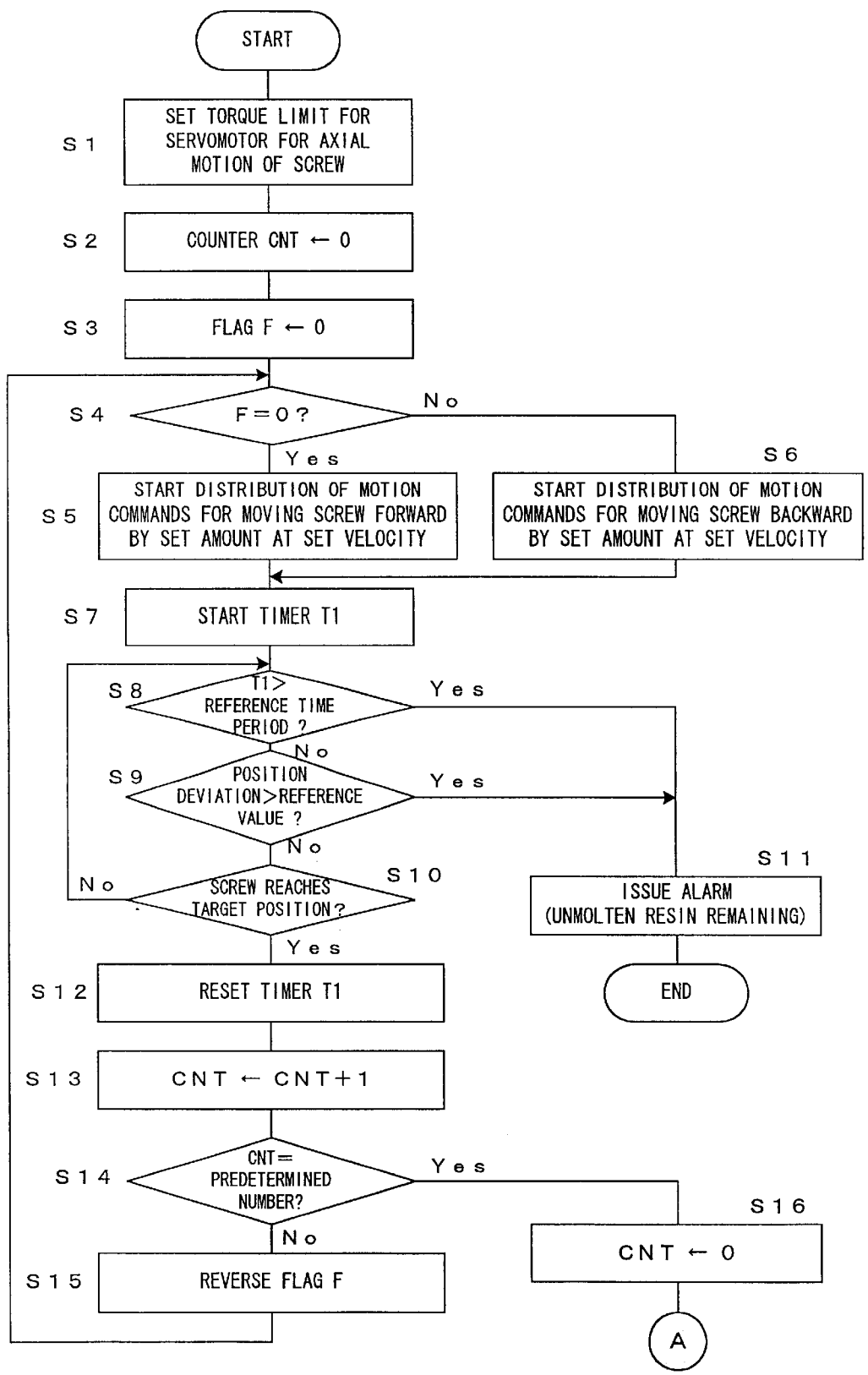
FIG. 2 is a flowchart of processing for detecting excessive load on an injection screw as shown in FIG. 1.
Figure 3:
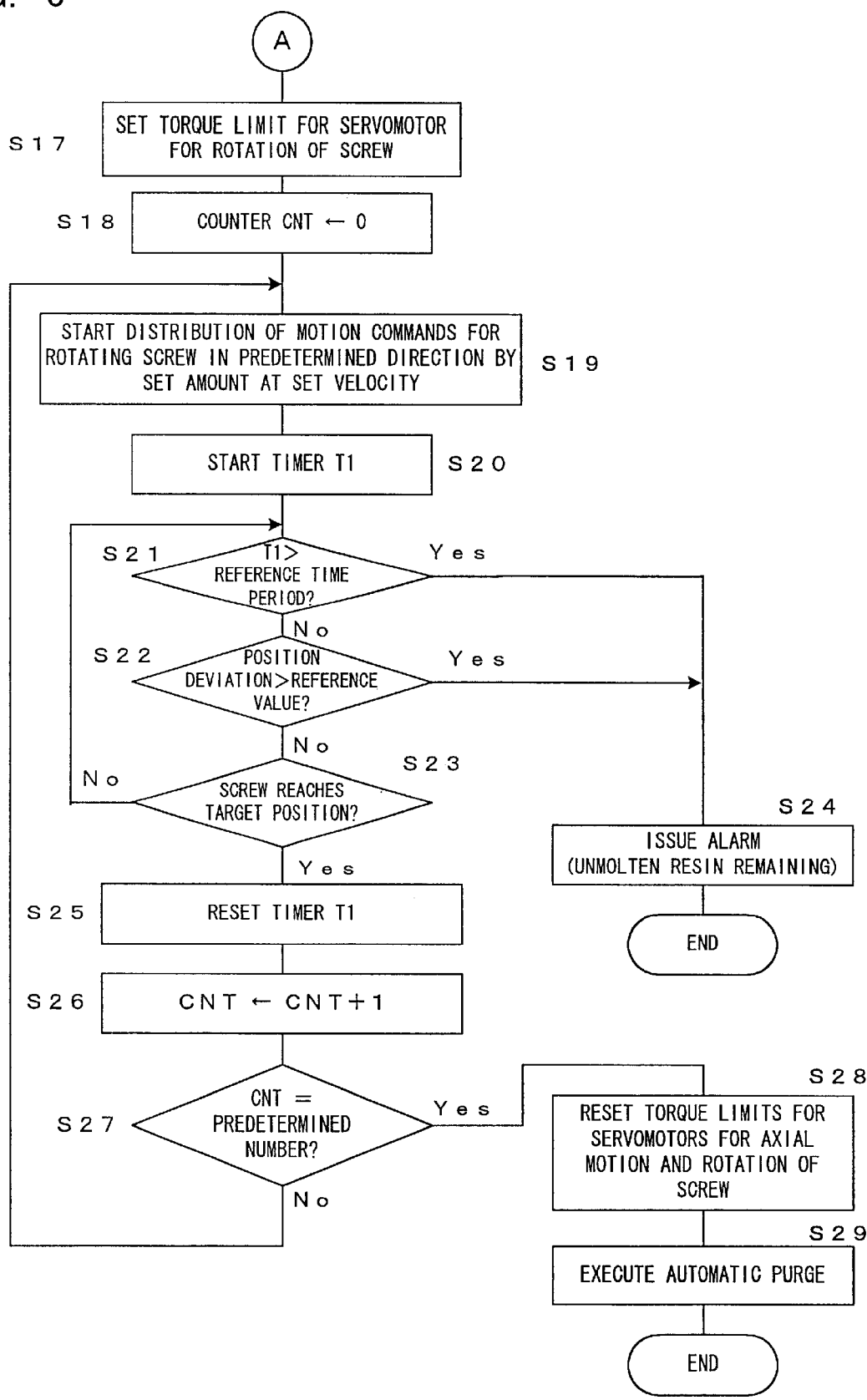
FIG. 3 is a continuation of the flowchart of FIG. 2.

When an automatic purge command is inputted from the MDI 36, the PC CPU 28 starts the processing shown by the flowchart of FIGS. 2 and 3.

First, a torque limit value predetermined for the detection of an excessive load on the screw by the axial motion thereof is set as the torque limit value of the torque limiter 43 shown in FIG. 4 (Step S1). A counter CNT for counting the number of axial motions of the screw is cleared to "0" (Step S2), and a flag F indicating a driving direction of the screw is set to "0" (Step S3).

Subsequently, it is determined whether the flag F is "0" or not (Step S4). If the flag F is "0", a command is issued for moving the screw forward by a set amount at a set low speed and positioning the screw at a target position determined by the set amount to the CNC UPU 35 (Step S5). If the flag F is not "0", a command is issued for moving the screw backward by the set amount at the set low speed and positioning the screw at a target position determined by the set amount to the CNC UPU 35 (Step S6). Substantially simultaneously with the issuing of the command to the CNC UPU 35, a timer T1 is started (Step S7). Since the flag F is initially set to "0" in Step S3, the screw is initially driven to move forward in the excessive load detection processing.

The CNC CPU 35 distributes motion commands to the servo CPU 29 for the servomotor M1 to move the screw by the set amount at the set speed in the designated direction. The servo CPU 29 performs the servo control as shown in FIG. 4 based on the distributed commands. Specifically, a speed command is obtained by the position feedback processing based on a position deviation between the distributed motion command and a position feedback signal, and a torque command is obtained by the velocity feedback processing based on a velocity deviation between the velocity command and a velocity feedback signal. Further, if the obtained torque command is not greater than the torque limit value set in Step S1, this torque command is outputted to the current loop as it is, but if the obtained torque command is greater than the torque limit value, this torque command is limited to the torque limit value and the torque limit value is outputted to the current loop. The current feedback processing is performed based on the torque command, to drive the servomotor M1 for axial motion of the screw.

During the above described driving of the servomotor M1, the PC CPU 28 determines whether or not the timer T1 measures a reference time period (Step S8), whether or not the position deviation obtained by the position feedback processing by the servo CPU 29 exceeds a set reference value (Step S9), and whether or not a signal indicating that the screw has reached the target position is outputted from the servo CPU 29 (Step S10). This signal is issued when all the motion commands for the set motion amount are outputted from the CNC CPU 35 and the position deviation is within the predetermined range (in-position range) to confirm that the position of the screw has reached the target position.

In the state where the resin remaining in the heating cylinder 1 is adequately molten and thus the load on the screw in axial motion thereof is small, the screw reaches the target position within the reference time period without the position deviation exceeding the reference value. In such case the timer T1 is reset to "0" (Step S12), the counter CNT is incrementally increased by "1" (Step S13) and it is determined whether or not the counter CNT reaches a predetermined number (Step S14). If the counter CNT has not reached the predetermined number, the flag F is reversed (Step S15), i.e., the flag F is set to "1" when the current value is "0", and set to "0" when the current value is "1", and the procedure returns to Step S4 to repeatedly execute the processing of Step S4–S14.

The screw 3 is driven by the servomotor M1 with its maximum output torque limited to the torque limit value, and therefore if the resin remaining in the heating cylinder 1 is inadequately molten to have high viscosity, the screw can not reach the set target position within the reference time period (Step S8), or the position deviation exceeds the reference value because the screw can not reach the set velocity by the limited output torque of the servomotor M1 (Step S9). In such case, the PC CPU 28 issues an alarm to stop the operation of the injection molding machine (Step S11).

When the counter CNT reaches the predetermined number (Step S14) without any alarm after the screw is moved forward (Step S5) and backward (Step S6) alternately, the counter CNT is cleared to "0" (Step S16) and the procedure proceeds to Step S17.

The predetermined number of the forward and backward motion may be set to "1". In this case, the procedure proceeds from Step S14 to Step S16 when only one forward motion of the screw 3 is completed without an alarm. Further in this case, the processing of Steps S2–S4, S6 and S13–S16 may be omitted, i.e., the procedure proceeds from Step S11 directly to Step S5 and from Step S12 directly to Step S17.

When the screw 3 is moved forward and backward by the predetermined number without any alarm, the processing of Step 17 and subsequent Steps is executed for detecting an excessive load on the screw 3 by rotation of the screw 3. The excessive load detection by rotation of the screw 3 is substantially the same processing as the excessive load detection by the axial motion of the screw, but differs from that in that the motor to be driven is the servomotor M2 for rotation of the screw in place of the servomotor M1 for axial motion of the screw and that the driving of the screw is performed in one direction.

A torque limit value for limiting the output of the screw rotation servomotor M2 is set to the torque limiter (Step S17) and the counter CNT is set to "0" (Step S18). A command is issued to the servomotor M2 for rotating the screw 3 in a predetermined direction by a set motion amount at a set velocity and positioning the screw at a target position determined by the set motion amount (Step S19), and substantially simultaneously, the timer is started (Step S20). If the screw reaches the target position without the position deviation exceeding a reference value before the timer measures a reference time period, the timer T1 is reset to "0" and the counter CNT is incrementally increased by "1". If the counter CNT does not reach the predetermined number, the processing returns to Step S19.

If the timer measures the reference time period before the screw 3 reaches the target position (Step S21) or if the position deviation exceeds the reference value (Step S22), an alarm is issued to inform unmolten state of resin (Step S24).

When the value of the counter CNT reaches the predetermined number without any alarm, the torque limits for the servomotor M1 and the servomotor M2 are reset and the procedure proceeds the automatic purging process.

In the foregoing embodiment, it is first determined whether or not an excessive load is exerted on the screw when the screw is moved axially and then determined whether or not an excessive load is exerted on the screw when the screw is rotated. Thus, it is determined that the resin remaining in the heating cylinder is well molted to have adequate fluidity for driving the screw 3 safely and the procedure proceeds to the automatic purge process based on the confirmation that any excessive load is not exerted on the screw when the screw is moved axially and also rotated.

However, the fluidity of the remaining resin may be determined based solely on the processing of excessive load by axial motion of the screw 3. Alternatively, the fluidity of the remaining resin is confirmed by only the processing of determining excessive load by rotation of the screw 3 by the processing of Steps S17–S29.

Further, in the foregoing embodiment, the excessive load is detected based on the comparison between the position deviation and the reference value at Steps S9 and S22. In place of the comparison between the position deviation and the reference value, the pressure detected by the pressure sensor 18 and a reference value.

Further, the screw-axial motion servomotor M1 and the screw rotation servomotor M2 are driven with their output torques limited and the excessive load is detected. Alternatively, as indicated as a dotted line in FIG. 4, a set torque command may be directly inputted to the current loop to control the servomotor M1 to produce the set torque without performing the position and velocity controls. It is determined whether or not the screw is move by the set motion amount within the reference time period, and if the screw is not moved by the set motion amount within the reference time period, an alarm is issued to indicate the unmolten resin remaining in the cylinder.

In this case, the processing of Steps S1 and S17 are omitted and a set torque command for moving the screw forward is outputted in Step S5, and a set torque command for moving the screw backward is outputted in Step S6. Further, the processing of Steps S8–S10 may be replaced with processing of reading rotational motion amounts of the axial motion servomotor M1 and the screw rotation servomotor M2 when the timer T1 measured the set reference time period, and stops the torque command. If the read rotational motion amount exceeds the set reference value, an alarm is issued. If the read rotational amount does not exceed the set reference value, the processing of Steps S12–S15 or the processing of Steps S25–27 is performed to return to Step S4 or Step S19.

Furthermore, simultaneously with issuing the torque command to the current loop, the timer T is started and the elapsed time when the rotational amount of the servomotor M1 and/or the servomotor M2 reaches the set reference amount is compared with a reference time to determine the fluidity of the resin. If the elapsed time is longer than the reference time, an alarm is issued.

According to the present invention, the screw is initially driven to move forward in a direction of injecting the resin from the cylinder by driving the servomotor for axially moving the screw and it is determined whether or not an excessive load on the screw is detected due to the unmolten resin remaining in the cylinder. The screw head 4 exerts pressure on the resin remaining between the nozzle 2 and the distal end of the cylinder 1 to be injected from the injection hole at the distal end of the nozzle 2. If the viscosity of the resin is high, resistance of the resin between the screw 3 and the cylinder 1 and the resin in the injection hole and the nozzle 2 is made high to cause a large load on the screw 3. Contrary to the above, when the screw 3 is driven to move backward, the screw head 4 moves backward in the cylinder 1 to elongate the resin between the screw head 4 and the nozzle 2 to cause a lower resistance of the resin. In this case, an excessive load may not be detected in spite of the unmolten resin remaining in the cylinder. According to the conventional method of detecting the excessive load by axially moving the screw backward, the excessive load exerted on the screw when the screw is moved forward may not be detected. According to the present invention, since the screw is initially driven to move forward in a direction of injection, an excessive load is securely detected when the unmolten resin remains to have high viscosity in the cylinder.

The excessive load detecting device of the present invention directly detects an excessive load on the screw by driving the motor for moving the screw in lieu of indirectly detecting an excessive load based on temperature of the heating cylinder, so that an excessive load caused by the remaining unmolten resin is precisely and safely detected.

What is claimed is:

1. An excessive load detection device for detecting an excessive load on a screw of an injection molding machine; comprising:

a servomotor to drive the screw axially;

a limiter to limit a driving force of said servomotor;

a controller to start driving of said servomotor for axially moving the screw in a direction of injection by a predetermined amount at a predetermined velocity; and a timer to measure elapsing time from the start of the driving of said servomotor to a completion of the axial motion of the predetermined amount, wherein said controller issues an alarm when the elapsing time measured by said timer exceeds a reference time.

2. An excessive load detection device for an injection molding machine according to claim 1, wherein said controller repeatedly executes driving of said servomotor to axially move the screw in the direction of injection and the reversed direction alternately predetermined times.

3. An excessive load detecting device for an injection molding machine according to claim 1, wherein said controller includes a servo-controller for performing a position/velocity feedback control using a position deviation for the servomotor, and issues an alarm when the position deviation exceeds a set reference value before the axial motion of the predetermined amount is completed.

4. An excessive load detecting device for detecting an excessive load on a screw of an injection molding machine comprising:
- a servomotor to drive the screw axially;
- a limiter to limit a driving force of said servomotor;
- a controller to drive said servomotor at a predetermined velocity for a predetermined time period to axially move the screw in a direction of injection; and
- a detector to detect an amount of motion of said servomotor or the screw driven by said servomotor for the predetermined time period,
- wherein said controller issues an alarm when the amount of motion detected by said detector does not exceed a reference amount.

5. An excessive load detecting device for detecting an excessive load on a screw of an injection molding machine comprising:
- a motor to drive the screw axially;
- a controller to drive said motor at a predetermined torque for a predetermined time period to axially move the screw in a direction of injection; and
- a detector to detect an amount of motion of said motor or the screw for the predetermined time period,
- wherein said controller issues an alarm when the amount of motion does not exceed a reference amount.

6. An excessive load detecting device for detecting an excessive load on a screw of an injection molding machine comprising:
- a motor for driving the screw axially;
- controller to start driving of said motor with a predetermined torque and stop driving of said motor when motion of said motor or the screw driven by said motor reaches a predetermined amount; and
- a timer for measuring a time period from the start to the stoppage of driving of said motor,
- wherein said controller issues an alarm when the time period measured by said timer exceeds a predetermined time period.

7. An excessive load detecting device for detecting an excessive load on a screw of an injection molding machine comprising:
- a servomotor to drive the screw axially;
- a controller to drive said servomotor for moving the screw in a direction of injection by a predetermined amount at a predetermined velocity, said controller including a servo-controller to perform a position/velocity feedback control using a position deviation of said servomotor; and
- a torque limiter to limit a torque command outputted from said servo controller;
- wherein said controller issues an alarm when the position deviation exceeds a reference value before the motion of the screw of the predetermined amount is completed.

8. An excessive load detecting device for detecting an excessive load on a screw of an injection molding machine comprising:
- a servomotor to drive the screw rotationally;
- a limiter to limit a driving force of said servomotor;
- a controller to start driving of said servomotor for rotating the screw by a predetermined amount at a predetermined velocity; and
- a timer to measure elapsing time from a start of the driving of the servomotor to a completion of the rotation of the predetermined amount,
- wherein said controller issues an alarm when the elapsing time measured by said timer exceeds reference time.

9. An excessive load detection device for an injection molding machine according to claim 8, wherein said controller repeatedly executes driving of said servomotor to rotate the screw predetermined times.

10. An excessive load detection device for an injection molding machine according to claim 8, wherein said controller includes a servo-controller for performing a position/velocity feedback control using a position deviation for the servomotor, and issues an alarm when the position deviation exceeds a reference value before the rotational motion of the screw of the predetermined amount is completed.

11. An excessive load detecting device for detecting an excessive load on a screw of an injection molding machine comprising:
- a servomotor to drive the screw rotationally;
- a limiter to limit a driving force of said servomotor;
- a controller to drive said servomotor at a predetermined velocity for a predetermined time period; and
- a detector to detect a rotational amount of said servomotor or the screw for the predetermined time period,
- wherein said controller issues an alarm when the rotational amount detected by said detector does not exceed a reference amount greater than zero.

12. An excessive load detecting device for detecting an excessive load on a screw of an injection molding machine comprising:
- a servomotor to drive the screw rotationally;
- a controller to drive said servomotor at a predetermined torque for a predetermined time period; and
- a detector to detect a rotational amount of said servomotor or the screw for the predetermined time period,
- wherein said controller issues an alarm when the rotational amount measured by said detector does not exceed a reference amount greater than zero.

13. An excessive load detecting device for detecting an excessive load on a screw of an injection molding machine comprising:
- a servomotor to drive the screw rotationally;
- a controller to drive said servomotor for rotating the screw by a predetermined amount at a predetermined velocity, said controller including a servo-controller for performing a position/velocity feedback control using a position deviation of said servomotor; and
- a torque limiter for limiting a torque command to be outputted from said servo controller,
- wherein said controller issues an alarm when the position deviation exceeds a reference value before the axial motion of the predetermined amount is completed.

* * * * *